United States Patent
Prakash et al.

(10) Patent No.: US 6,719,030 B2
(45) Date of Patent: Apr. 13, 2004

(54) PNEUMATIC TIRE HAVING A SINGLE CARCASS PLY REINFORCED WITH METALLIC CORDS, A HIGH ENDING PLY, TURNUP AND LOCKED BEAD CONSTRUCTION

(75) Inventors: Amit Prakash, Hudson, OH (US); Donald Woodrow Gilliam, Uniontown, OH (US); Gary Edwin Tubb, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/236,587

(22) Filed: Sep. 6, 2002

(65) Prior Publication Data

US 2003/0019557 A1 Jan. 30, 2003

Related U.S. Application Data

(60) Continuation of application No. 09/073,460, filed on May 6, 1998, now abandoned, which is a division of application No. 07/518,777, filed on Aug. 24, 1995, now Pat. No. 5,779,829.

(51) Int. Cl.[7] .............................. B60C 9/00; B60C 9/02; B60C 15/00; B60C 15/06
(52) U.S. Cl. ........................ 152/540; 152/451; 152/539; 152/543; 152/546; 152/548; 152/552; 152/554
(58) Field of Search ................................. 152/451, 507, 152/556, 534, 540, 543, 546, 552, 554, 548; 57/902, 212; 148/59; 420/90, 91, 100, 104, 112, 115

(56) References Cited

U.S. PATENT DOCUMENTS

| 3,638,705 A | 2/1972 | Devienne et al. |
| 4,387,759 A | 6/1983 | Obata et al. |
| 4,390,052 A | 6/1983 | Mendiola et al. |
| 4,922,985 A | 5/1990 | Gasowski et al. |
| 4,930,560 A | 6/1990 | Lesti et al. |
| 4,941,523 A | 7/1990 | Galante et al. |
| 4,960,473 A | 10/1990 | Kim et al. |
| 4,966,216 A | 10/1990 | Kawasaki et al. |
| 4,986,327 A | 1/1991 | Takahira |
| 5,058,649 A | 10/1991 | Hoang et al. |
| 5,415,216 A | 5/1995 | Kajiwara et al. |
| 5,490,551 A | 2/1996 | Prakash et al. |
| 5,512,380 A | 4/1996 | DeVos et al. |
| 5,524,688 A | 6/1996 | Trares et al. |
| 5,603,208 A | 2/1997 | Fujita et al. |
| 5,609,013 A | 3/1997 | Kaneda et al. |

FOREIGN PATENT DOCUMENTS

| CA | 1242-963 A | 10/1988 |
| JP | 2-11406 | 1/1990 |
| JP | 5-195455 | 8/1993 |
| JP | 6-184962 | 7/1994 |
| JP | 6-184963 | 7/1994 |
| WO | WO 89/09305 | 10/1989 |

*Primary Examiner*—Adrienne C. Johnstone
(74) *Attorney, Agent, or Firm*—John D. DeLong; Bruce J. Hendricks

(57) ABSTRACT

The pneumatic tire has a single carcass ply reinforced with parallel metallic cords, each cord composed of at least one filament having a tensile strength of at least ($-2000 \times D + 4400$ MPa) $\times 95\%$, where D is the filament diameter in millimeters. The turnup portion of the single carcass ply 12 in the bead portion of a pneumatic tire is interposed between the bead core 11 and a toe guard 18, and the radially outer edge of each turnup portion being in contact with the main portion of the carcass ply and extending to an end point 0.5 to 4.0 inches (12.7 to 101.6 mm) radially outward of the bead core. The toe guard 18 has a first and second end and each end is disposed directly adjacent to the carcass ply. The first end 18a of the toe guard is located on the axially inner side of the main portion of the carcass ply at a location about 0.4 to 3.5 inches (10 to 89 mm) radially outward of the bead core and the second end 18b is located at a point ranging from substantially the axially outermost point of the bead core 11 to a location about 3.5 inches (89 mm) radially outward of the bead core. The first end 18a and second end 18b of the toe guard is a shorter distance from the bead core than the end point 12a of the turnup portion of the carcass ply.

13 Claims, 2 Drawing Sheets

PNEUMATIC TIRE HAVING A SINGLE CARCASS PLY REINFORCED WITH METALLIC CORDS, A HIGH ENDING PLY, TURNUP AND LOCKED BEAD CONSTRUCTION

This is a Continuation of application Ser. No. 09/073,460, filed on May 6, 1998, now abandoned, which is a Divisional of application Ser. No. 08/518,777, filed on Aug. 24, 1995, now U.S. Pat. No. 5,779,829.

BACKGROUND OF THE INVENTION

The present invention relates to a pneumatic tire having a single carcass reinforced with high strength metallic cords and a high ending turnup and a locked bead construction.

TECHNICAL FIELD

The desirability of having the turnup portions of the carcass ply (or plies) of a pneumatic tire extend radially outwardly of the bead core the shortest possible distance is the premise on which prior art locked beads were developed. The proposed advantages included improved bead durability, and reduced material costs.

U.S. Pat. No. 4,922,985, issued May 8, 1990, discloses a carcass ply 30 having a main portion that extends between both bead cores (not shown) of the tire and turnup portions that are anchored around each bead core 31. Tires according to U.S. Pat. No. 4,922,985 have the radially outer edges of the turnup portions of the carcass ply disposed radially outwardly of the bead cores a minimal distance and are in contact with the main portion of the carcass ply. Suitable elastomeric materials surround the bead core, carcass ply and other elastomeric components to complete the bead portion of the tire. In FIG. 4 of this patent, there is illustrated a clamping member 432 comprised a strip of side-by-side cords of a heat shrinkable material embedded in a suitable elastomeric substance having a permanent thermal shrinkage of at least 2 percent. This strip of cords extended from a location radially and axially inward of the bead core 431 to a location radially outward of the bead core and there was no filler strip or apex disposed between the main portion and turnup portion of the carcass ply.

Tires according to U.S. Pat. No. 4,922,985 were manufactured using a clamping member in which the heat shrinkable material was 1260/2 Nylon 6,6, having a permanent thermal shrinkage of about 4 percent. It is continually the goal in the art to simplify the construction and reduce the expense of building tires, yet improve the durability, handling, rolling resistance and other properties of tires.

SUMMARY OF THE INVENTION

The present invention relates to a pneumatic tire having a pair of axially spaced apart annular bead cores and a single carcass ply which is folded about each bead core. Each bead core comprises a plurality of wraps of a single metallic filament. The single carcass ply is reinforced with parallel metallic cords composed of at least one filament having a tensile strength of at least $(-2000 \times D + 4400 \text{ MPa}) \times 95\%$, where D is the filament diameter in millimeters. The single carcass ply is folded about each bead core. The single carcass ply has a main portion that extends between the bead cores and turnup portions that are folded around the bead cores. A radially outer edge of each turnup portion is in contact with the main portion of the carcass ply and extends to an end point 0.5 inches (12.7 mm) to 4.0 inches (101.6 mm) radially outward of the bead core, as measured along the main portion of the carcass ply of the tire. No bead apex or filler is present between the carcass turnup and the main portion of the carcass ply. A toe guard associated with each bead has each end (first and second) of the toe guard being disposed directly adjacent to the carcass ply. One (the first) end is located on the axially inner side of the main portion of the carcass ply at a location about 0.4 to 3.5 inch(s) (10 mm to 89 mm) radially outward of the bead core as measured along the main portion of the carcass ply. The other or second end of the toe guard is located at a point ranging from substantially the axially outermost point of the bead core to a location about 3.5 inches (89 mm) radially outward of the bead core as measured along the turnup portion of the carcass ply. The first end and second end of the toe guard is a shorter radial distance from said bead core than the end point of the turnup radial portion of the carcass ply. The respective turnup portion of the carcass ply is directly adjacent to both the toe guard and the bead core.

DETAILED DESCRIPTION OF THE INVENTION

As used herein and in the claims:

"Axial" and "axially" are used herein to refer to lines or directions that are parallel to the axis of rotation of the tire.

"Bead" means that part of the tire comprising an annular tensile member wrapped by ply cords and shaped, with our without other reinforcement elements such as flippers, chippers, apexes, toe guards and chafers, to fit the design of the tire rim.

"Belt structure" means at least two layers of plies of parallel cords, woven or unwoven, underlying the tread, unanchored to the bead, and having both left and right cord angles in the range from about 17 to about 27 degrees with respect to the equatorial plane (EP) of the tire.

"Carcass" means the tire structure apart from the belt structure, the tread and the undertread, but including the beads. The carcass ply includes reinforcing cords embedded in an elastomeric substance and that these components are considered to be a single entity. The "main portion of the carcass ply" means the portion of the carcass ply which extends between the bead cores.

"Cord" means one or more of the reinforcement elements, formed by one or more filaments/wires which may or may not be twisted or otherwise formed and which may further include strands that may or may not be also so formed.

"Crown" means that portion of the tire within the width limits of the tire tread.

"Equatorial plane (EP)" means the plane perpendicular to the tire's axis of rotation and passing through the center of the tire's tread.

"Load Range" means load and inflation limits for a given tire used in a specific type of service as defined by tables in *The Tire and Rim Association, Inc.* 1995 *Year Book.*

"Ply" means a continuous layer of rubber-coated parallel filaments.

"Pneumatic tire" means a laminated mechanical device of generally toroidal shape (usually an open-torous) having beads, a carcass ply and a tread.

"Prefix Letters" means those identifications used and defined in *The Tire and Rim Association, Inc.* 1995 *Year Book*.

"Radial" and "radially" are used to mean directions radially perpendicular from the axis of rotation through the tire.

"Radial-ply tire" means a belted or circumferentially restricted pneumatic tire in which the carcass ply reinforcements which extend from bead to bead are laid at angles between 75° and 105° with respect to the equatorial plane of the tire.

"Rivet" means the open space between cords in a layer.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Tensile strength" is determined by ASTM A370-92 as applied to steel wire product.

Figure 1:
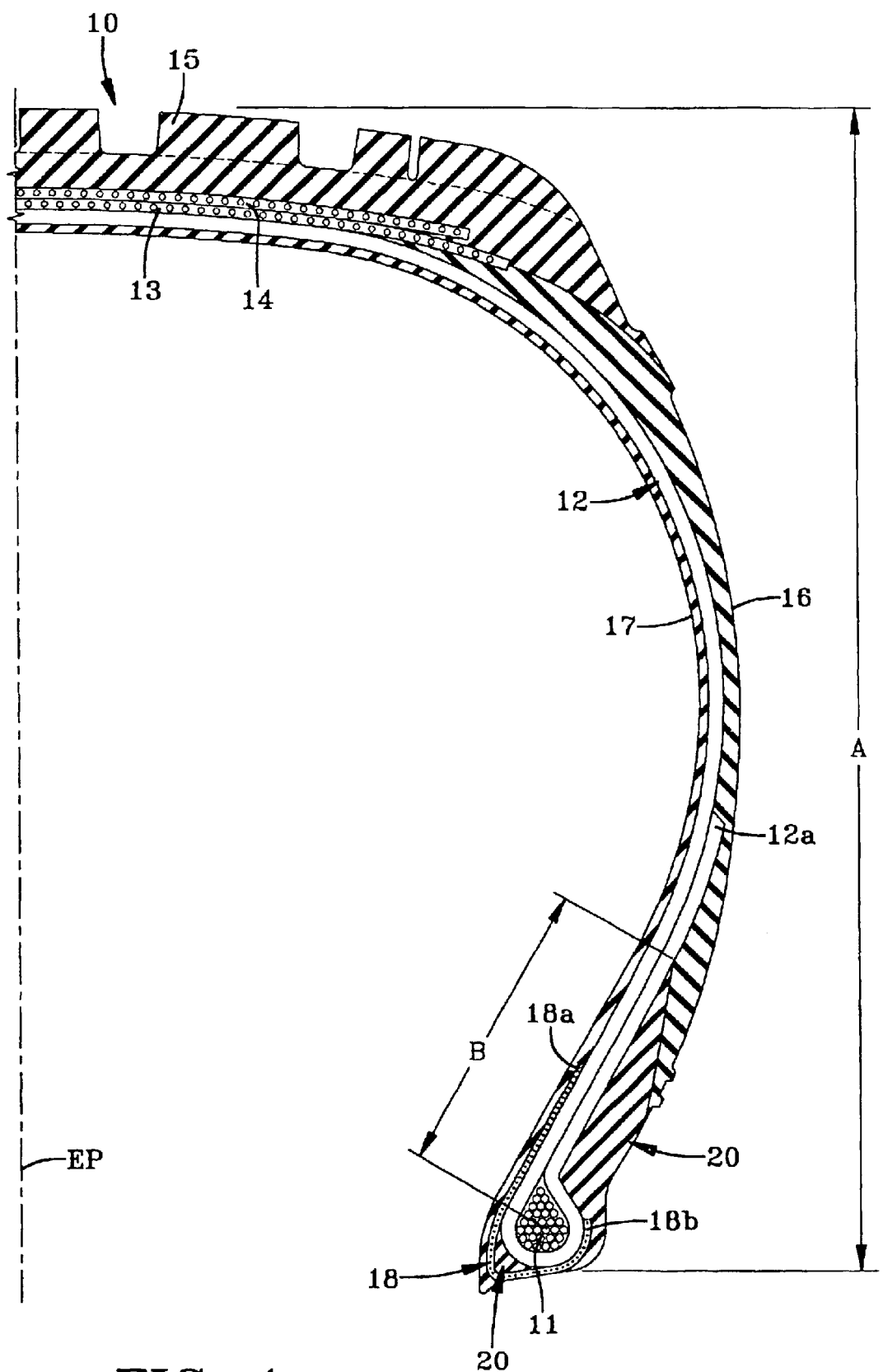
FIG. 1 is a partial or fragmentary cross-sectional view of a tire according to the present invention.
Figure 2:
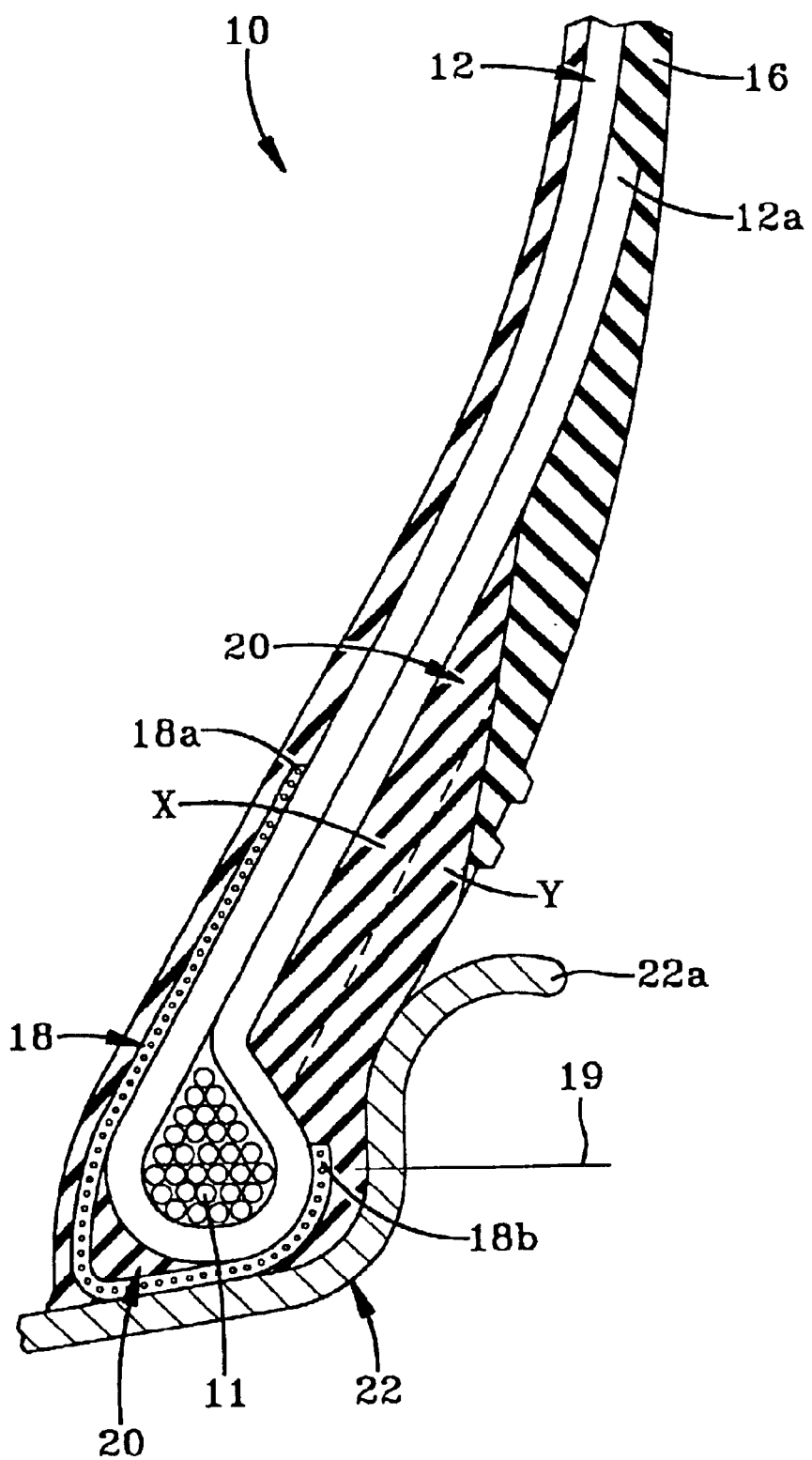
FIG. 2 is a fragmentary cross-sectional view of the bead portion of a tire according to the present invention mounted upon a rim.

Referring now to FIGS. 1 and 2, there is shown a fragmentary cross-sectional view of a tire 10 according to the present invention and an enlarged fragmentary view of a bead portion and lower sidewall mounted upon a rim.

FIG. 1 shows a fragmentary cross-sectional view of a tire 10 of the present invention. The tire has a pair of bead cores 11 (only one shown) which each comprise a plurality of metallic filaments. The tire 10 is characterized by a single carcass ply 12 that extends between the bead cores 11 and a turnup portion anchored around each bead core 11. A belt structure having at least two belts 13,14 is disposed radially outwardly of the main portion of the carcass ply and a ground engaging tread portion 15 is disposed radially outwardly of the belt structure. Sidewall portions 16 (one shown) extend radially inwardly from the tread portion to the bead portions. On the axially inner side of the carcass ply, an innerliner 17 may be used. The innerliner consists of a layer or layers of elastomer or other material that form the inside surface of the tire and contains the inflating fluid, such as air, within the tire 10. It may be desirable to place additional barriers, reinforcement strips or gum strips (not shown) at suitable locations between the innerliner 17 and main portion of the carcass ply to avoid penetration of rubber through the carcass ply during curing.

One critical aspect of the invention is a single ply carcass construction reinforced with parallel metallic cords composed of the above-described filaments. There are a number of metallurgical embodiments which result in the tensile strength defined above. One way of achieving such strength is by merging the proper process and alloys as disclosed in U.S. Pat. Nos. 4,960,473 and 5,066,455, which are hereby incorporated by reference in its entirety herein, with a steel rod microalloyed with one or more of the following elements: Ni, Fe, Cr, Nb, Si, Mo, Mn, Cu, Co, V and B. The preferred chemistry is listed below in weight percentages:

| | |
|---|---|
| C | 0.88 to 1.0 |
| Mn | 0.30 to 0.05 |
| Si | 0.10 to 0.3 |
| Cr | 0 to 0.4 |
| V | 0 to 0.1 |
| Cu | 0 to 0.5 |
| Ni | 0 to 0.5 |
| Co | 0 to 0.1 |
| the balance being iron and residuals | |

The resulting rod is then drawn to the appropriate tensile strength.

For equal filament diameters, the cords used in the present invention have higher strength and generally higher fatigue life over prior art tensile cords. These advantages lead to pneumatic tires which have less reinforcement material and thus lower weight and cost. Further the life of the tire can be increased with the increase in fatigue life of the cord and its filaments. When the new cord structures incorporate filaments having a smaller diameter, there is a resulting reduction in gauge material and cost as compared with the high or super tensile strengths making the tires lighter in weight and less costly.

The cords for use in the single ply carcass ply may comprise from one (monofilament) to multiple filaments. The number of total filaments in the cord may range from 1 to 13. Preferably, the number of filaments in per cord ranges from 6 to 7. The individual diameter (D) of each filament generally ranges from 0.15 to 0.30 mm for each filament having at least a tensile strength of $(\times 2000 \times D + 4400) \times 95\%$ where D is the filament diameter in mm. Preferably, the diameter of each filament ranges from 0.17 to 0.22 mm.

Another critical property of the steel cord is that the total elongation for each filament in the cord must be at least 2 percent over a gauge length of 25 centimeters. Total elongation is measured according to ASTM A370-92. Preferably, the total elongation of the cord ranges from about 2 percent to 4 percent. A particularly preferred total elongation ranges from about 2.2 to about 3.0.

The torsion values for the steel for the filament used in the cord should be at least 20 turns with a gauge length of 200 times the diameter of the wire. Generally, the torsion value ranges from about 20 to about 100 turns. Preferably, the torsion values range from about 30 to about 80 turns with a range of from about 35 to 65 being particularly preferred. The torsion values are determined according to ASTM Test Method E 558-83 with test lengths of 200 times the diameter of the wire.

There are a number of specific metallic cord constructions for use in the single carcass ply. Representative examples of specific cord constructions include 1×, 2×, 3×, 4×, 5×, 6×, 7×, 8×, 11×, 12×, 1+2, 1+4, 1+5, 1+6, 1+7, 1+8, 2+1, 3+1, 5+1, 6+1, 11+1, 12+1, 2+7, 2+7+1, 3+9, 1+5+1 and 1+6+1 or 3+9+1, the outer wrap filament may have a tensile strength of 2500 MPa or greater based on a filament diameter of 0.15 mm. The most preferred cord constructions including filament diameters are 3×0.18, 1+5×0.18, 1+6× 0.18, 2+7×0.18, 2+7×0.18×1×0.15, 3+9×0.18+1×0.15, 3+9× 0.18, 3×0.20+9×0.18 and 3×0.20+9×0.18+1×15. The above cord designations are understandable to those skilled in the art. For example, designation such as 2×, 3× and 4× mean a bunch of filaments; i.e., two filaments, three filaments, four filaments and the like. Designation such as 1+2 and 1+4 indicate, for example, a single filament wrapped by two or four filaments.

The carcass ply 12 has a layer of the above-described steel cords arranged so as to have from about 5 to about 70 ends per inch ($\approx 2$ to 28 ends per cm) when measured at the equatorial plane of the tire. Preferably, the layer of cords are arranged so as to have about 7 to about 20 ends per inch ($\approx 2.7$ to 8 ends per cm) at the equatorial plane. The above calculations for ends per inch are based upon the range of diameters for the cord, strength of the cord and the practical strength requirement for the carcass ply. For example, the high number of ends per inch would include the use of a lower diameter cord for a given strength versus a lower number of ends per inch for a higher diameter wire for the same strength. In the alternative, if one elects to use a cord of a given diameter, one may have to use more or less ends per inch depending on the strength of the cord.

The metallic cords of the carcass ply 12 are oriented such that the tire according to the present invention is what is commonly referred to as a radial.

The steel cord of the carcass ply intersect the equatorial plane (EP) of the tire at an angle in the range of from 75° to 105°. Preferably, the steel cords intersect at an angle of from 82° to 98°. The preferred range is from 89° to 91°.

A tire according to the present invention has a pair of axially spaced-apart bead cores 11 which each comprise a plurality of wraps of a single metallic filament. Each of the bead cores has a radial cross-sectional shape which may be substantially pentagonal, hexagonal, rectangular or circular. In the instance where the bead has a radial cross-sectional shape which is substantially pentagonal, the greatest axial width of the bead core is located radially outwardly of the radially innermost edge of the bead core. As used herein, a "radial cross section" is a cross section taken in a plane which contains the axis of rotation of a tire or tire and rim assembly. As used herein, "substantially pentagonal" is understood to mean a five-sided cross section, even though some or all of the sides may be curvilinear rather than rectilinear, as in a regular pentagon. The radially outermost extent of the bead core being a vertex of two of the sides of the pentagon and the greatest axial width of the bead core being located radially outwardly of the radially innermost edge of the bead core.

A carcass ply 12 and a toe guard 18 are folded about each bead core 11. As mentioned above, the carcass ply 12 has a main portion that extends between the bead cores and turnup portions that are folded around the bead cores 11. The radially outer edge of each turnup portion is in contact with the main portion of the carcass ply and extends to an end point 12a 0.5 inches (12.7 mm) to 4.0 inches (101.6 mm) $h_1$ radially outward of the bead core 11 from substantially the middle of the bead core, as measured along the main portion of the carcass ply of the tire. Preferably, the turnup portion extends to an end point 12a 0.5 inches (12.7 mm) to 3.5 inches (88.9 mm) radially outward of the bead core 11. The locking in of the bead is achieved by the adhesion between the high turnup and the main portion of the single carcass ply, and the restriction of the flange of rim 22 when the tire is mounted on the rim and inflated. As can be seen in FIG. 2, the entire bead construction is below the top of the flange, and the pentagonal shape of the bead compliments the natural pressures between the tire and the rim in holding the bead on the rim when the tire is inflated. This is particularly true when tires employing high inflation, e.g. 50 psi, use the construction of the present invention. Also, because the axially outer end of the toe guard 18 is clamped below the top of the rim flange 22a, chances that the toe guard would suffer a ply end separation are substantially reduced. The high turnup, and the consequent high area of adhesive contact between the turnup and the main carcass ply, further stabilizes the bead.

A toe guard 18 is associated with each bead core 11. Each toe guard 18 has a first-end 18a and a second end 18b. Each end 18a and 18b is disposed directly adjacent to the carcass ply 12. The first end 18a is located on the axially inner side of the main portion of the carcass ply at a location about 0.4 inches (10 mm) to 3.5 inches (89 mm) $h_2$ radially outward of the bead core from substantially the middle of the bead core. Preferably, the first end 18a is located on the axially inner side of the main portion of the carcass ply at a location about 0.4 inches (10.16 mm) to 2.0 inches (50.8 mm) radially outward of the bead core. The second end 18b of the toe guard 18 is located at a point ranging from substantially the axially outermost point of the bead core to a location about 3.5 inches (89 mm) $h_3$ radially outward of the bead core from substantially the middle of the bead core, as measured along the turnup portion of the carcass ply. Preferably, the second end 18b of the toe guard 18 is located at a point ranging from substantially the axially outermost point of the bead core to a location about 2.0 inches (50.8 mm) radially outward of the bead core.

The toe guard 18 may be a rubber material, a flexible textile material or a heat shrinkable material. For example, according to one embodiment, the toe guard 18 may comprise a strip of side-by-side cords of a non-metallic heat shrinkable material which has a permanent thermal shrinkage of at least 2 percent. The shrinkage generally runs from about 2 percent to 5 percent. The cords are generally oriented from about 0° to 75° with respect to the centerplane of the tire. The strip of side-by-side cords are generally wrapped circumferentially about the bead core and carcass ply turnup a plurality of times. As used herein, "permanent thermal shrinkage" means the intrinsic dimensional stability of a material when it is exposed to an elevated temperature as indicated by the percentage of permanent shrinkage determined using the test method and apparatus disclosed in U.S. Pat. No. 4,922,985, incorporated by reference in its entirety. Representative examples of side-by-side cords of a non-metallic heat shrinkable material having a permanent shrinkage of at least two percent include the use of 1260/2 Nylon 6,6 cords, 850/1 Nylon 6,6 cords, 1000/1 Nylon 6,6 cords. The cords may be parallel to each other or square woven.

Examples of a rubber material include gum strips.

The single carcass ply 12 and toe guard 18 are encased in suitable elastomeric compounds. Other than the elastomer compound encasing the bead core and carcass ply, no apex or filler strip is generally present or needed between the carcass ply turnup and the main portion of the carcass ply. However, a tire designer core may employ an apex or filler strip if he so desires.

A belt structure comprising a plurality of belt plies 13,14 is located radially outwardly of the single carcass ply 12 in a crown portion of the tire. An elastomeric tread portion 15 is disposed radially outwardly of the belt structure. The belt structure has at least two annular layers or plies of parallel cords, woven or unwoven, underlying the tread, unanchored to the bead. Generally, the belt structure has both left and right cord angles in the range from 40 to 15° with respect to the equatorial plane of the tire. It is understood that the particular belt structure illustrated in FIGS. 1 and 2 and described herein is merely an example used in the preferred embodiment and that a tire designer may employ any arrangement of belt plies in accordance with the performance requirements of the particular tire while still practicing the present invention. For example, in those instances where a larger tire is being constructed for use in a radial light truck application, three or more belts may be used. In addition, the cords in the belt plies may be rayon, polyester, glass fiber, aramid, steel wire or the like. Preferably, the cord is steel wire having a tensile strength of at least $(-1400 \times D+4050) \times 95\%$ when D is as described above. Particularly preferred is when the cords are composed of at least one filament having a tensile strength of at least $(-2000 \times D+4050) \times 95\%$ when D is as described above.

The pneumatic tires of the present invention may be designed for various load ranges. For example, the load ranges may be A, B, C, D or E. Preferably, the load range is E.

The pneumatic tires of the present invention may also be designated by various prefix letters depending on the designed service conditions requiring different loads and inflations. For example, the tires may be designated by AT, LT, P and ST. Preferably, the pneumatic tire is LT.

A pneumatic radial ply tire according to FIGS. 1 and 2 was manufactured in the size LT 235/85R16.

The metallic filament used in the bead cores of the illustrated embodiment is 0.05 inch (1.27 mm) diameter steel wire-coated with bronze to enhance its bonding with rubber. Of course, depending upon the tire size, other filament diameters could be used in practicing the invention.

Each of the bead cores 11 has a radial cross-sectional shape which is substantially pentagonal. For example, in the light truck tire of size LT 235/85R16, each of the bead cores may be fabricated having eight radially superposed layers of wraps of said single metallic filament. The number of wraps in each layer, beginning with the radially innermost layer being 4,5,6,5,4,3,2,1. For other sizes of tires, different numbers of layers, and wraps in each layer may be used.

The single carcass ply and toe guard are encased in suitable elastomeric compounds. It may be desirable to interpose a flipper between the carcass ply and the pentagonal bead core. The flipper may be of the same material used in the toe guard or a layer of a tough abrasion resistant rubber. The flipper is intended to prevent chafing of the cords of the carcass ply against any sharp edge of the bead core. An alternative to use a flipper is to wrap the bead with materials showing utility as a flipper. A tire according to the illustrated embodiment in FIGS. 1 and 2 has a toe guard comprising 850/1 Nylon 6,6 cords spaced at 28 cords per inch (≈11 cords per cm) and oriented at 45$^+$ with respect to a plane which is parallel to the equatorial plane EP of the tire.

The carcass ply turnup is folded about a pentagonal-shaped bead bundle 11 and locked against the main portion of the carcass ply 12 by the sidewall 16. In the illustrated embodiment, the single carcass ply with turnup portion terminated at an end point 12a, 2.8 inches (≈71 mm), respectively, radially outward of the bead core as measured along the main portion of the carcass ply.

In the specific illustrated embodiment (see FIG. 1), the axially outer end 18b of toe guard 18 is located at a point coinciding substantially with the axially outermost point of the bead core. The axially inner end 18a of toe guard 18 is located 0.56 inches (13 mm) radially outward of the bead core, as measured along the main portion of the carcass ply.

An axially outer elastomeric stiffening member 20 comprising an elastomeric compound having a Young's Modulus of 3,400 pounds per square inch (p.s.i.) or greater is located from a point axially outwardly of the carcass ply and toe guard and extends to a point located along the turnup portion short of end 12. For example, in a tire of size LT 235/85R16, having a maximum section height A of about 7.8 inches (19.81 cm), the axially outer stiffening member extends radially outwardly a distance B of about 2.5 inches (6.35 cm) from the bead core of the tire.

As used herein "Young's Modulus" is the tensile property determined according to the test procedure described in U.S. Pat. No. 5,058,649, incorporated by reference in its entirety.

It has been found that the present bead construction is very stable and can demonstrate high stability using ply coat compounds and chafer (stiffening) compounds having a broad range of properties. Suitable properties for ply coat compounds and chafer 20 compound fall in the following ranges.

|  | Young's Modulus (MPa) | Elongation |
| --- | --- | --- |
| Plycoat | 10.0–20.0 | 300%–600% |
| Stiffening Piece | 9.0–15.0 | 120%–300% |

The axially outer stiffening member 20 aids in moving stress concentrations away from the edge of the carcass ply 12, which is expected to aid in reducing failures due to separations of the tire components. A layer of sidewall rubber 16 is disposed axially outwardly of the carcass ply in the sidewall portion of the tire in the usual manner.

Using the present construction, it has been found that the tire of the invention can be made without using apexes, clamping members and chippers in the bead area of the tire. This construction is lighter in weight than prior art constructions, which provides operating efficiencies. Production efficiencies are also realized. It has been found that the construction of the instant invention shows improved bead durability.

While certain representative embodiments and details have been shown for the purpose of illustrating the invention, it will be apparent to those skilled in the art that various changes and modifications may be made therein without deviating from the spirit or scope of the invention.

EXAMPLE

Four LT 235/85R16 tires (Load Range E) were tested for durability. Two tires were, according to the present invention and the other two control tires, had two layers of carcass ply reinforced with 1300/3 polyester cord. The ends per inch of the control tires for the carcass ply was 27 measured at the bead (13.9 at the equatorial plane of the tire). Each tire, according to the present invention, was a single layer or ply for the carcass reinforced with parallel metallic cords (1+5× 0.18). The EPI at the circumferential plane was 14.3. The tensile strength of the filament used in the cord was 4000 MPa, the total elongation for each filament exceeded 2 percent over a gauge length of 25 cm, and the torsion values for each filament was between 35 and 65. Other than these differences, the four tires were, according to the same specification, including toe guard. Each toe guard for all four tires comprised 850/1 Nylon 6,6 cords spaced at 28 cords per inch (≈11 cords per cm) and oriented at 45° with respect to a plane which is parallel to the EP of the tire. The second end of each toe guard (axially outer end) was located at a point coinciding substantially with the axially outermost point of the bead core. The first end of each toe guard was located on the axially inner side of the main portion of the carcass ply(s) at a location approximately 0.56 inches (13 mm) radially outward of the bead core, as measured along the main portion of the carcass ply(s) The carcass ply turnup for the single carcass ply tire of the present invention and the two-ply polyester carcass tire terminated at an end point 2.8 inches (71 mm) radially outward of the bead core as measured along the main portion of the carcass ply.

The table below lists the results from the durability tests.

|  | Control 2-Ply Polyester | Control 2-Ply Polyester | Steel Ply | Steel Ply |
|---|---|---|---|---|
| 1. Total Weight (Kg) | 18.2 | 18.2 | 18.5 | 18.5 |
| 2. D.O.T. | Passed | Passed | Passed | Passed |
| 3. Outdoor (Km) | 43,336 | 25,256 | 115,860 | 104,654 |

[1]Tires tested on a resiliometer at 80 psi (551.2 KPa) and 100% of rated load (Load Range E)

As can be seen from the above data, the tires according to the present invention have improved durabilities ranging from 241 percent to 458 percent over the control two-ply polyester tires.

What is claimed is:

1. A pneumatic tire comprising:
   (a) a pair of axially spaced apart annular bead cores, each bead core comprising a plurality of wraps of a single metallic filament, each bead core having a radial cross-sectional shape;
   (b) a single carcass ply reinforced with a parallel metallic filament cords, each filament having a tensile strength of at least $(-2000 \times D + 4400 \text{ MPa}) \times 95\%$, where D is the filament diameter in millimeters, said single carcass ply being folded about each said bead core, said carcass ply having a main portion that extends between the bead cores and turnup portions that are folded around the bead cores, a radially outer edge of each said turnup portion being in contact with said main portion and extending to an end point 0.5 inches (12.7 mm) to 4.0 inches (101.6 mm) radially outward of the bead core, as measured along the main portion of the carcass ply of the tire and said cords having a construction selected from the group consisting of 1+6, 2+7, 2+7+1, 3+9, 1+6+1 and 3+9+1; and
   (c) a toe guard associated with each bead core and having first and second ends wherein each end thereof is disposed directly adjacent to said carcass ply, said first end being located on the axially inner side of the main portion of the carcass ply at a location about 0.4 inches (10 mm) to 3.5 inches (89 mm) radially outward of the bead core as measured along the main portion of the carcass ply and said second end being located at a point ranging from substantially the axially outermost point of the bead core to a location about 3.5 inches (89 mm) radially outward of the bead core as measured along the turnup portion of the carcass ply, and wherein the first end and second end of the toe guard is a shorter radial distance from said bead core than the end point of the turnup portion of the carcass ply.

2. The pneumatic tire of claim 1 where D is from 0.15 to 0.30.

3. The pneumatic tire of claim 2 where D is 0.17 to 0.22.

4. The pneumatic tire of claim 1 wherein said metallic cords in said carcass ply are arranged so as to have from 5 to 70 ends per inch when measured at the equatorial plane of the tire.

5. The pneumatic tire of claim 1 wherein said bead core has a radial cross-sectional shape which is selected from the group consisting of substantially pentagonal, hexagonal, rectangular and circular.

6. The pneumatic tire of claim 1 wherein said bead core is substantially pentagonal with the greatest axial width of the bead core being located radially outwardly of the radially innermost edge of the bead core and with the radially outermost extent of the bead core being the vertex of two of the sides of the pentagon.

7. The pneumatic tire of claim 1 wherein said radially outer edge of each said turnup portion being in contact with said main portion and extends to an end point 0.5 inches (12.7 mm) to 3.5 inches (88.9 mm) radially outward of the bead core, as measured along the main portion of the carcass ply of the tire.

8. The pneumatic tire of claim 1 wherein said first end of said toe guard is located on the axially inner side of the main portion of the carcass ply at a location about 0.4 inches (10.16 mm) to 2.0 inches (50.8 mm) radially outward of the bead core.

9. The pneumatic tire of claim 1 wherein said second end of said toe guard is located at a point ranging from substantially the axially outermost point of the bead core to a location about 2.0 inches (50.8 mm) radially outward of the bead core as measured along the turnup portion of the carcass ply.

10. The pneumatic tire of claim 1 having a load range selected from the group consisting of A, B, C, D and E.

11. The pneumatic tire of claim 10 having a load range E.

12. The pneumatic tire of claim 1 designated by a prefix letter selected from the group consisting of AT, LT, P and ST.

13. The pneumatic tire of claim 12 designated by the prefix letter LT.

* * * * *